US012178361B2

(12) United States Patent
Tareen et al.

(10) Patent No.: US 12,178,361 B2
(45) Date of Patent: Dec. 31, 2024

(54) DYNAMIC POWER CONTROL OF TORQUE IN MOTOR

(71) Applicant: Vita-Mix Management Corporation, Olmsted Township, OH (US)

(72) Inventors: Saifur Tareen, Wadsworth, OH (US); David Kolar, Stow, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 805 days.

(21) Appl. No.: 17/298,331

(22) PCT Filed: Dec. 4, 2019

(86) PCT No.: PCT/US2019/064457
§ 371 (c)(1),
(2) Date: May 28, 2021

(87) PCT Pub. No.: WO2020/117928
PCT Pub. Date: Jun. 11, 2020

(65) Prior Publication Data
US 2022/0117444 A1    Apr. 21, 2022

Related U.S. Application Data

(60) Provisional application No. 62/774,996, filed on Dec. 4, 2018.

(51) Int. Cl.
*A47J 43/08*    (2006.01)
*A47J 43/046*   (2006.01)
*H02K 7/14*     (2006.01)
*H02P 23/00*    (2016.01)

(52) U.S. Cl.
CPC .......... *A47J 43/082* (2013.01); *A47J 43/046* (2013.01); *H02K 7/14* (2013.01); *H02P 23/00* (2013.01)

(58) Field of Classification Search
CPC ............................ A47J 43/082; A47J 43/085
See application file for complete search history.

(56) References Cited

U.S. PATENT DOCUMENTS

| | | | |
|---|---|---|---|
| 9,859,836 B2 | 1/2018 | Yokoyama et al. | |
| 9,999,320 B2* | 6/2018 | Dickson, Jr. | ............ B01F 27/61 |
| 2003/0133235 A1* | 7/2003 | Yung | ........................ H02P 1/04 |
| | | | 318/245 |
| 2011/0046786 A1 | 2/2011 | Wulf et al. | |
| 2016/0256007 A1 | 9/2016 | Dickson, Jr. et al. | |
| 2016/0309960 A1 | 10/2016 | Kolar et al. | |
| 2018/0168401 A1* | 6/2018 | Weiss | ...................... A47J 43/06 |

OTHER PUBLICATIONS

Patent Cooperation Treaty (PCT), International Search Report and Written Opinion for Application PCT/US2019/064457 filed Dec. 4, 2019, mailed Feb. 5, 2020, International Searching Authority, US.

* cited by examiner

*Primary Examiner* — Elizabeth Insler
(74) *Attorney, Agent, or Firm* — Dinsmore & Shohl LLP

(57) ABSTRACT

A motor for a blender may include an armature and a coil. The coil and armature operatively receive power from a power source. The blender may include a controller and a memory. The memory may store instructions that, when executed by the controller, cause the controller to dynamically alter an output current to the motor. The instructions adjust the output current supplied to the motor at a given speed to reduce torque of the motor to match a preferred torque versus speed profile.

8 Claims, 4 Drawing Sheets

DYNAMIC POWER CONTROL OF TORQUE IN MOTOR

CROSS-REFERENCE TO RELATED APPLICATION

This application is a 35 U.S.C. 371 national stage filing of PCT Application No. PCT/US2019/064457 filed on Dec. 4, 2019, and entitled "DYNAMIC POWER CONTROL OF TORQUE IN MOTOR," which claims priority to U.S. Provisional Patent Application No. 62/774,996 entitled "DYNAMIC POWER CONTROL OF TORQUE IN MOTOR," filed on Dec. 4, 2018, each of which are incorporated herein by reference in its their entireties.

BACKGROUND

Many appliances use motors to convert electrical energy to mechanical energy. Blenders, for examples, use motors to blend or mix drinks or other food. Presently, appliance motors, or more specifically, blender motors have to be designed to operate at specific performance points of speed and torque to effectively operate, i.e., to operate effectively in a blender or blending device. If a motor with a lower speed-torque characteristics is required for a specific purpose—such as in a blender or blending device, an off-the shelf motor will not suffice. Instead, a custom motor has to be designed to meet the applicable requirements for the blender or blending device. Having to use a more expensive custom motor makes the resulting blender or blending device more expensive and makes it more difficult to produce the blender/blending device. Needing a custom motor can also make it more difficult to find a suitable manufacturer, which may increase the time to market for the applicable product.

There is a need, therefore, for a motor that can be used in appliances, such as kitchen appliances and, more specifically, in blending devices that meets performance criteria while also reducing cost and improving production.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Disclosed is a blender system including a blender base, a blade assembly, a motor disposed within a housing of the blender base configured to drive the blade assembly, a memory storing instructions for adjusting operating parameters of the motor, and a controller coupled to the memory and operatively executing the instructions to adjust the operating parameters of the motor. The memory may be a read only memory. The operating parameters may include at least one upper limit of torque associated with a speed of the motor. The controller operatively executes the instructions to control current supplied to the motor such that torque of the motor does not exceed the at least one upper limit of torque when the motor operatively rotates at the associated speed. The blender system may further include an attachment having a near field communication (NFC) coil and memory device, wherein the attachment is operatively attachable to the blender base. The blender base may include a near field communication coil configured to communicate with the near field communication coil of the attachment to receive information regarding adjustment of the operating parameters of the motor based upon stored information within the memory of the attachment. The controller may operatively receive the information from the attachment to identify a type associated with the attachment and operating parameters associated with the type. The controller may further execute the instructions to operatively detect a speed of the motor and operatively reduce current applied to the motor based upon the detected speed. The instructions for adjusting the operating parameters may include an algorithm that defines relationship between torque and speed of the motor.

In another embodiment, a blender system includes a blender base, a motor disposed within the blender base, the motor comprising a brushless motor, and a controller and a memory storing instructions that when executed by the controller cause the controller to determine an output signal to be applied to the motor based on a speed of the motor and an upper limit of torque associated with the speed of the motor. The output signal further controls a current to be applied to the motor. The blender base is operatively attached to a blade assembly. The memory stores the instructions as firmware. The controller determines parameters of the output signal based on an algorithm defining a speed versus torque curve. The controller operatively monitors the speed of the motor and determines the parameters of the output signal based on the monitored speed and the speed versus torque curve. Further, the controller operatively receives a wireless signal identifying the operating parameters. The controller further operatively adjusts the torque of the motor based upon a container identification associated with the operating parameters.

Further disclosed is a method of controlling torque in a motor of a blender including providing blender base housing a motor. The method may include providing a controller coupled to the motor. In another aspect, the method may include monitoring, via the controller, a speed of the motor. The method may include determining, via the controller, a torque limit for the motor that is associated with the speed of the motor; and adjusting, in response to determining that the torque limit is reached, a current supplied to the motor.

The method further include applying a transfer function to the speed of the motor in determining the torque limit. The transfer function defines a relationship between the speed of the motor and torque of the motor over a range. The controller further determines whether to operate the motor based on detecting whether a container and a lid are attached to the blender base.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Figure 1:
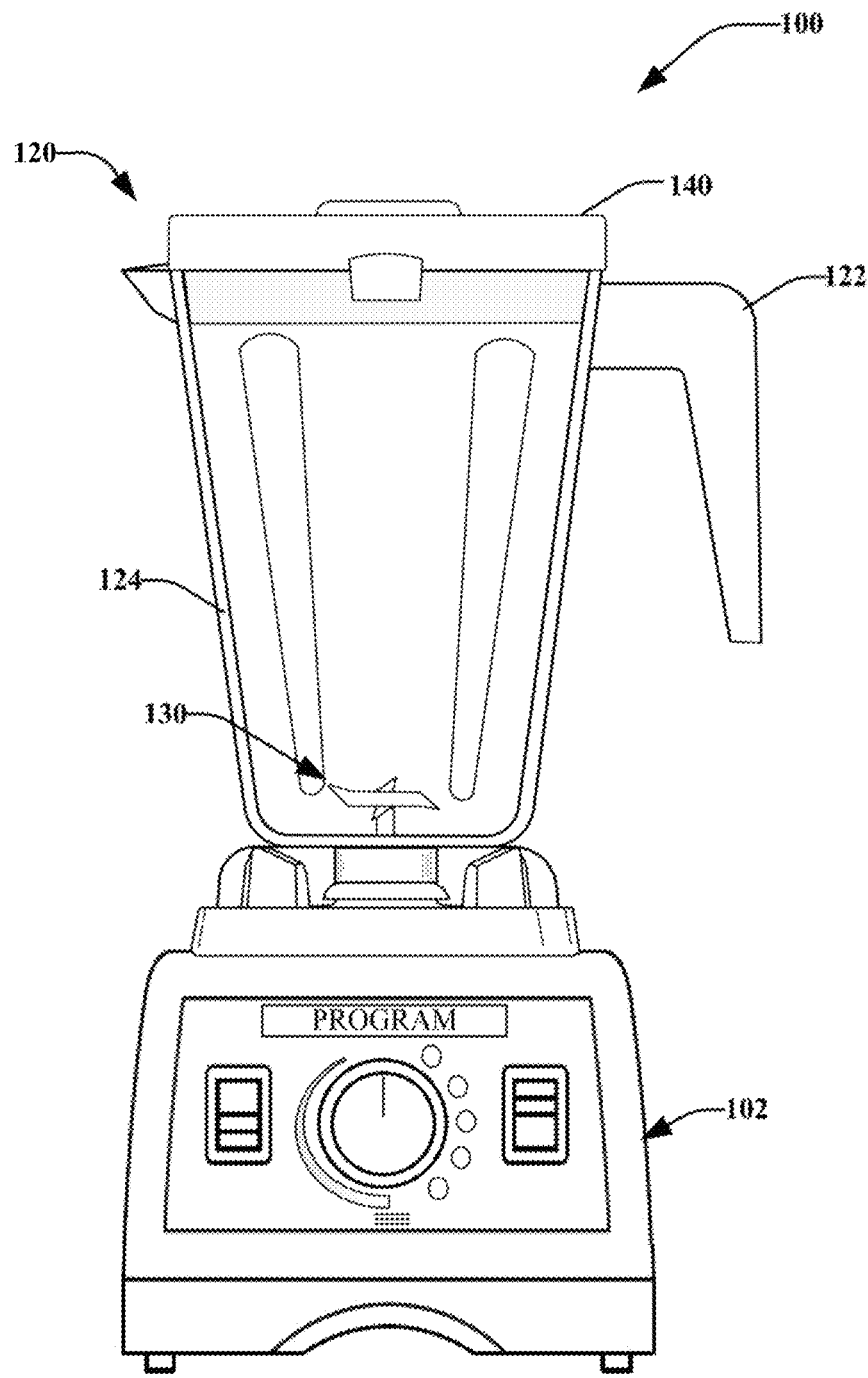
FIG. 1 illustrates an embodiment of a blender.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, home appliances, fans, power tools, or other machines using motors. As such, references to a blender, blending system, and the like, are understood to include the various other machines.

Blender systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuff" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In described embodiments, a blender system may include a blender base comprising a motor and a housing that houses the motor. The motor may comprise any kind of appliance motor, such as a DC motor. The blender may include a motor controller that includes instructions stored in memory that are capable of dynamically controlling current applied to the motor, which allows application of a lower speed torque to be applied to the motor. This permits an off-the-shelf motor to be utilized in a blender while maintaining the prior performance capabilities of a custom motor. In at least some examples, the instructions stored in the memory are executed by the controller such that the controller varies an output signal to operatively adjust a current supplied to the motor.

FIG. 1 illustrates an exemplary blending system 100 in accordance with various disclosed embodiments. System 100 may utilize various disclosed aspects of the present teachings. For instance, system 100 may include a large format container, a personal serving sized container, or other blending container as described herein. It is noted that blending system 100 may include a universal motor with a controllable torque or speed, such as by a controller (not pictured) within a blender base 102. The controller may include memory that may store information and instructions, such as firmware that may be downloadable, updated, or the like. In some embodiments, the firmware may be stored in read only memory. In other embodiments, the firmware may be stored in other types of memory.

System 100 primarily includes the blender base 102, a container 120 operatively attachable to the blender base 102, a blade assembly 130, and a lid 140 that may be operatively attached to the container 120. The container 120 may include walls 124 and a handle 122. Foodstuff may be added to the container 120 for blending. It is noted that the container 120 may comprise various materials such as plastics, glass, metals, or the like. In another aspect, container 120 may be powered in any appropriate manner.

The blade assembly 130, container 120, and base 102 may removably or irremovably attach. The container 120 may be powered in any appropriate manner. While shown as a large-format system, system 100 may comprise a single serving style system, where the container is filled, a blender base is attached to the container, and then the container is inverted and placed on a base. In another aspect, the container 120 may comprise different sizes and shapes, such as cylindrical or the like.

The base 102 includes a motor disposed within a housing 103. The motor selectively drives the blade assembly 130. The blade assembly 130 may agitate, impart heat, or otherwise interact with contents within the container. Operation of the blender system 100 may impart heat into the contents within container 120 according to a desired blending program.

In at least one embodiment, the blending system 100 may identify or detect whether the system 100 is interlocked through mechanical detection (e.g., push rods), user input, image recognition, magnetic detection (e.g., reed switches), electronic detection (e.g., inductive coils, a near field communication (NFC) component), or the like. The system 100 may be in an interlocked state when the blender base 102 is attached or coupled with the container 120 or the container 120 with a lid 140 or blade assembly.

System 100 and processes described herein generally relate to blending or food-processing systems and may include a food-processing disc comprising one or more inductive coils. In another aspect, one or more of the disc(s), container, and/or lid may comprise an NFC component that may interact with an NFC component of a blender base. The NFC component of the blender base may receive information regarding the type of container or attachment and the blender base 102 may utilize the information to determine a blending process to be utilized by the system. In some examples, the controller is operatively coupled to the NFC component and operatively receives a wireless signal from an NFC component of an attachment. The controller may determine operating parameters based on a type (e.g., make or model) of the attachment. In some embodiments, the controller may receive specific operating parameters directly from the NFC component of the attachment.

Figure 2:
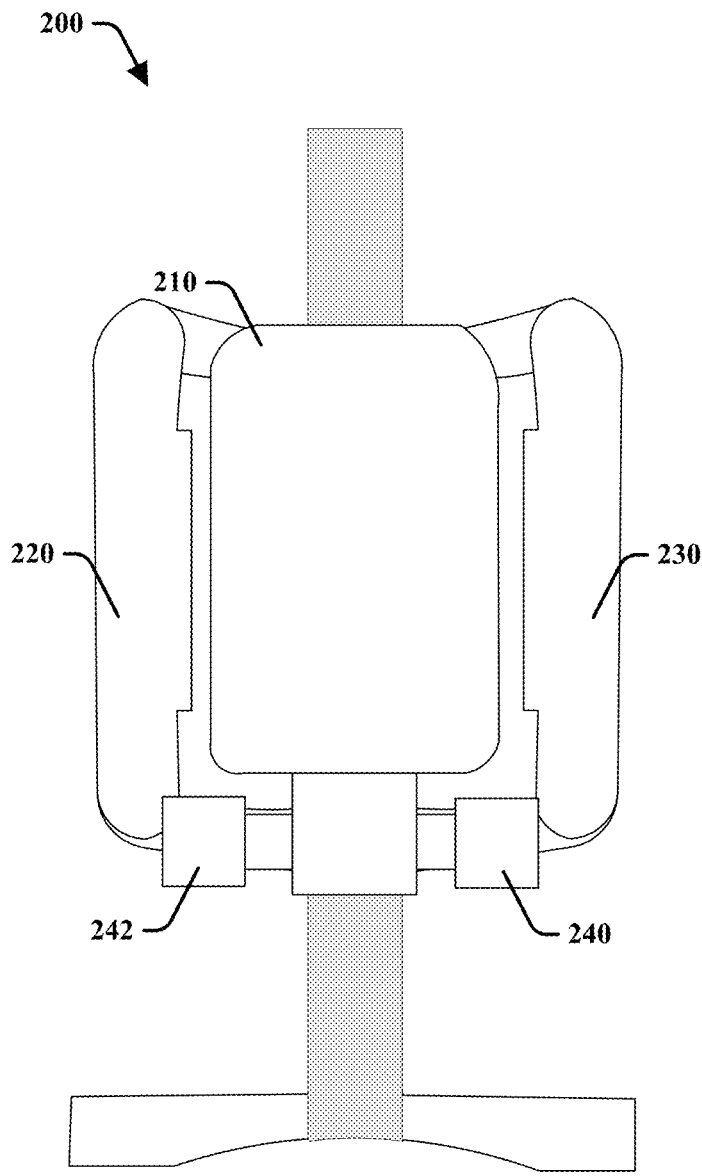
FIG. 2 illustrates an exemplary motor that may be utilized in the blender.

Turning to FIG. 2, there is a universal motor 200. This motor 200, as well as some other traditional motors, may be utilized by a blender. The motor 200 converts energy (e.g., electrical energy) into mechanical energy. The motor 200 operates with direct current (DC) or alternating current (AC). For the sake of brevity and in addition to what is shown and described in more detail below, the motor 200 is described as a brushless DC motor herein.

Motor 200 may include an armature 210 that is motivated by electrically created magnetic fields within the motor 200 to convert the electrical energy into mechanical energy. The armature may receive power via brushes 240 and 242. As electrical energy flows through stationary conductive coils 220 (e.g., a motor field) and the armature (e.g., in parallel, in series, etc.). As current passes through the coils 220 in the field and the armature 210, magnetic fields are created by each of them. The attracting and repelling of these fields cause the armature 210 to rotate.

As current increases through the motor 200, the magnetic fields created by both the armature 210 and coils 220 and 230 increase. A user may turn off the motor 200 by removing the power.

The motor 200 may operate at specific performance points of speed and torque. The motor 200 may have a predefined torque rating as shown by the green line in FIG. 3. This predefined torque rating may be that of an off-the-shelf-motor that has a higher speed versus torque performance than the one required. Utilizing this motor 200 in an appliance such as a blender may provide higher speed and torque ratings than what is required to efficiently operate the blender thereby raising the current rating of the appliance above the desired operating point. Traditionally, such motors cannot be used in blender systems. As such, some systems utilize custom motors with the exact speed versus torque profile. Such motors operate on static current control.

Embodiments described herein may provide for a blender comprising a controller and a motor, wherein the controller includes computer code (e.g., firmware) that, when executed, adjusts the speed and torque output of the motor. In some examples, the software may include firmware stored in a read-only-memory (ROM). For example, an embodiment of the present disclosure may utilize a standard available BLDC, AC Universal, or DC motor or the like and a controller that executes computer code to adjust the speed and torque output of this motor to an operating point that is lower than the motor's actual potential. This may allow the motor to achieve the appropriate performance. This will allow an off-the-shelf motor to be de-rated, thereby bringing its ratings to the point desired. This will allow the motor to run below its potential, increasing its reliability and life in the blender without needing a custom-built motor for the blender.

The required performance of the present teachings may comprise speed and torque to suit a particular type of blender jar or blender blade, container, or attachment, such as, a food processor, burr grinder, grain mill, soy milk maker, or other similar kitchen devices, especially those utilized with a blender base. The typical devices current control sets a single current limit for the motor and control system. However, having one current limit for every speed, the performance and flexibility of the system is limited. For example, setting a current limit at low speed operation will limit the total power output of the system during startup of the motor, which is typically a time when much more power is needed to start the blades spinning in a thick mixture. Conversely, a single current limit at high speed that allows for low speed, high current start up, may not adequately limit maximum power output at high speed that may damage an attachment component, such as, a gear drive system for a food processor.

Embodiments described herein utilize a controller and memory storing instructions to dynamic control or alter current applied to the motor based on determined limits for torque of the motor at given speeds. This may allow for the power imparted to the attachment to be tailored to the attachment's specific requirements. A dynamic current control limit will allow for various overload conditions while not having specific information about the process it is driving. This is a superior form of control versus a rule based algorithm as the rule based system will allow certain overload conditions but only if the logic of the rules are met.

The blender of the present system may include a controller with a memory. The memory may include a pre-installed algorithm that defines upper limits of torques for a corresponding set of speed points that thereby define a relationship between speed and torque of the motor over a range. In some embodiments, the algorithm applies a transfer function based on a sensed speed to determine an upper limit on the torque of the motor. The controller may appropriately adjust the torque of the motor by adjusting current supplied to the motor. The speed of the motor may be monitored by the controller of the blender. Specifically, the controller may dynamically control the current supplied to the motor so that the torque produced at a particular speed does not exceed the torque-limit as defined by the desired relationship. The algorithm may define several points or a few points along the desired speed versus torque behavior. The remaining values of a current for a given speed may be calculated by a method of estimating values within a range that fall between the defined points, such as any form of interpolation.

Further, in some embodiments, an attachment that may be placed onto the blender base. The attachment may include an NFC coil and memory device that stores information about a speed torque curve that is optimal for that particular attachment. The blender may include a method of reading the stored memory of the NFC tag and adjust the speed torque curve of the system to be updated to suit or specifically for that attachment. In examples, the attachment may comprise at least one of a personal blending container, large format blending container, a food processing container, cutting blades or disks, a wet or dry ingredient container, a spice or coffee grinding container, or the like.

Figure 3:
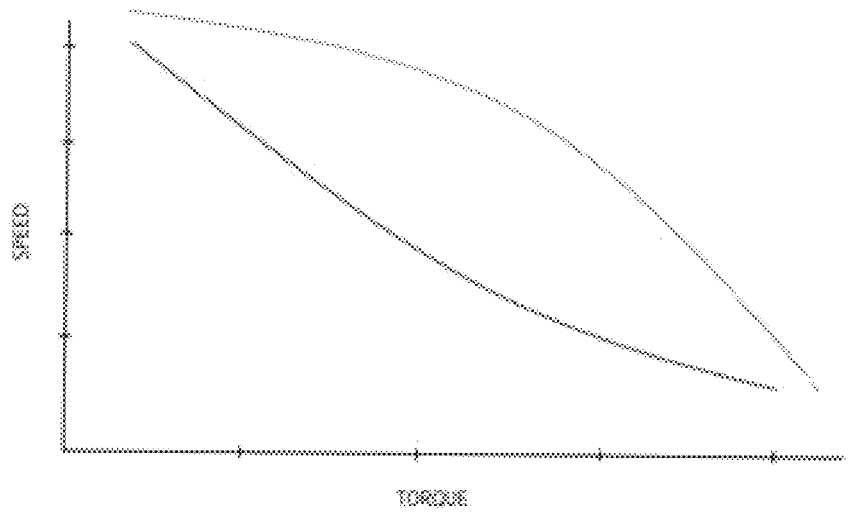
FIG. 3 illustrates a speed versus torque curve of a motor of the present teachings.

FIG. 3 depicts a speed versus torque plot of the motor without application of the algorithm of the controller, which is shown in green. The curve required to effectively and efficiently operate the blender is shown in red, below the green curve. The controller firmware of the present teaching monitors the speed and reduces the current applied to the motor at every speed to bring the torque down to the required/desired lower level shown by the red line in the plot of FIG. 3.

Figure 4:
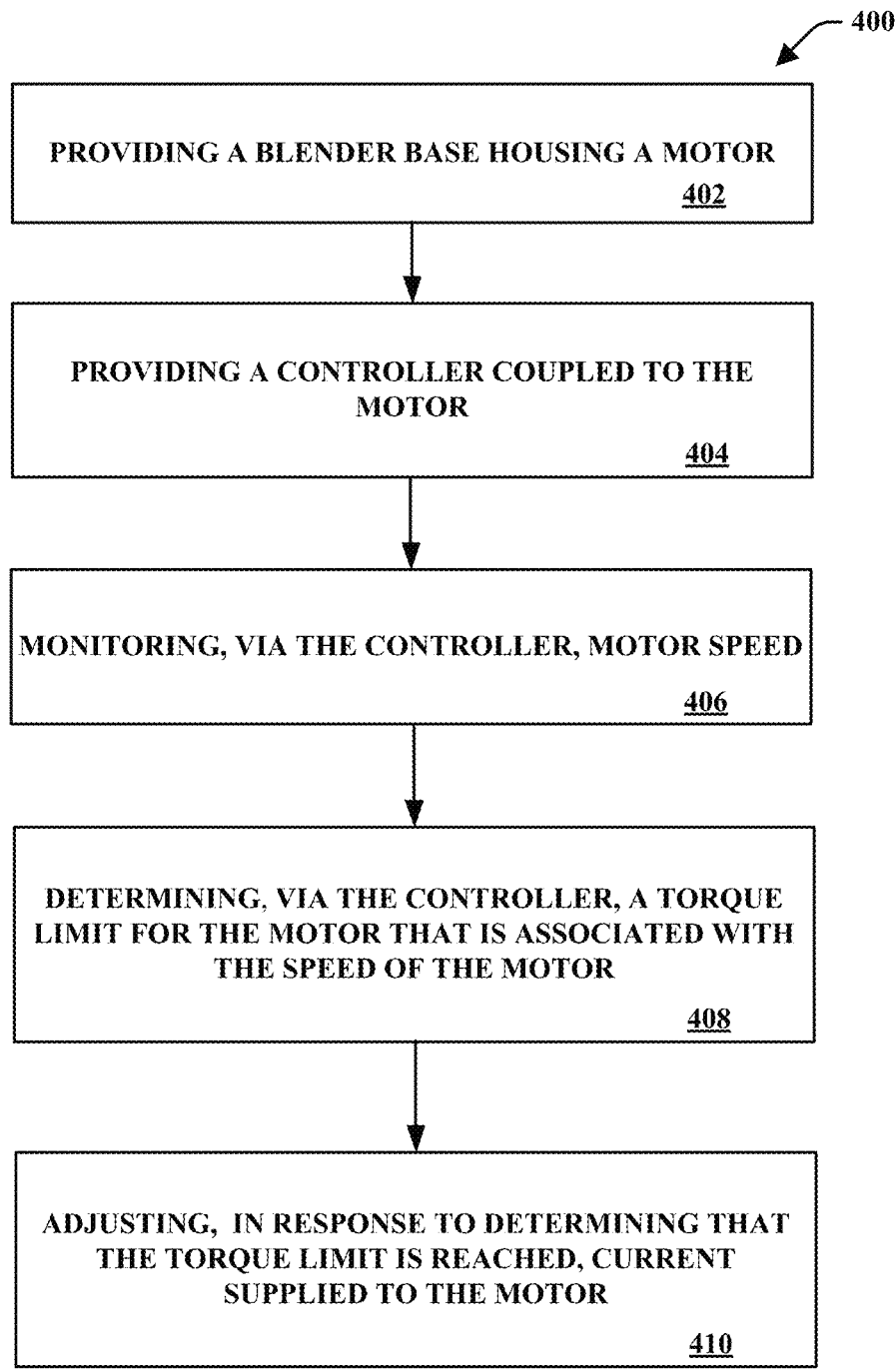
FIG. 4 is a flowchart of a method of controlling torque in a motor of a blender.

In view of the subject matter described herein, methods that may be related to various embodiments may be better appreciated with reference to the flowchart of FIG. 4. While the methods are shown and described as a series of blocks, it is noted that associated methods or processes are not limited by the order of the blocks unless context suggests otherwise or warrants a particular order. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 4 is a flowchart of an exemplary method 400 of controlling torque or current for a blender system comprising a motor (e.g., system 100) as described herein. For instance, the method may allow for control or modification of current flow to the motor to adjust (e.g., reduce) torque output based on a speed of the motor.

At 402, the method 400 may provide a blender base (e.g., blender base 102) that houses a motor (e.g., motor 200). The blender base may comprise a single serving blender base, large format blender base, commercial blender base, or the like. In another aspect, the motor may be capable of achieving operating torques and speeds greater than appropriate for a blender.

At 404, the method 400 may provide a controller coupled to the motor. The controller may include or be coupled with a memory. The memory may store instructions that are executable by the controller. In examples, the controller may comprise one or more computer processors and circuitry.

At 406, the method 400 may monitor, via the controller, a speed of the motor. The controller may monitor the speed of the motor based on measuring voltage applied to the motor, monitoring readings from sensors, or the like. In an example, stroboscopes, tachometers, or toher sensors may be used to measure the motor speed. Speed may be measured in an appropriate unit, such as revolutions per minute or the like.

At 408 the method 400 may determine, via the controller, a torque limit for the motor that is associated with the speed of the motor. The torque limit may define an upper torque output of the motor for the given speed. In examples, the torque limit may depend on a type of attachment(s) used with the blender system. For instance, for a given speed, the torque limits may depend on a type of container, a type of blade assembly, a type of cutting disc, or the like.

At 410, the method 400 may adjust, in response to determining that the torque limit is reached, a current supplied to the motor. In an example the method 400 may determine that a torque limit is reached by comparing a measured torque being output by the motor to a torque limit associated with a particular speed. Torque may be measured via a torque sensor (e.g., torque meter, torque transducer, etc.) or based on calculation from a measured applied voltage and current, as well as speed of the motor.

In at least some embodiments, the method 400 may include other aspects as described with reference to FIGS. 1-3. For instance, the method may include applying a transfer function to the speed of the motor to determine the torque limit. The transfer function defines a relationship between the speed of the motor and torque of the motor over a range. In an example, certain speeds may be associated with known upper torque limits. Based on the known upper torque limits for the speeds, a transfer function may interpolate upper torque limits for other speeds.

In an embodiment, the method 400 may include determining, via the controller, whether to operate the motor based on detecting whether attachments, such as a container, a lid, blades, or discs are attached to the blender base. For example, the method 400 may include identifying whether a container is appropriately placed on the blender base via mechanical detection, electrical detection, optical detection, or the like. In some embodiments, the method 400 may allow for operation of the motor when the container is in an operative position. In another aspect, the method 400 may require both the lid and the container to be in operative positions. As an example, the method 400 may allow for operation of the motor when a larger format blending container is positioned on the blender without a lid, but may disable operation of the motor when a food processing container is attached to the blender base without a lid.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A blender system, comprising:
   a blender base;
   a brushless motor disposed within the blender base; and
   a controller and a memory storing instructions that, when executed by the controller to apply a transfer function to a speed of the motor to determine an upper limit of torque associated with the motor, cause the controller to determine an output signal to be applied to the motor based on the speed of the motor and the determined upper limit of torque associated with the speed of the motor.

2. The blender system of claim 1, wherein the output signal controls a current to be applied to the motor.

3. The blender system of claim 2, wherein the blender base is operatively attached to a blade assembly.

4. The blender system of claim 1, wherein the memory stores the instructions as firmware.

5. The blender system of claim 1, wherein the controller determines parameters of the output signal based on an algorithm defining a speed versus torque curve.

6. The blender system of claim 5, wherein the controller operatively monitors the speed of the motor and determines the parameters of the output signal based on the monitored speed and the speed versus torque curve.

7. The blender system of claim 1, wherein the controller operatively receives a wireless signal identifying the operating parameters.

8. The blender system of claim 7, wherein the controller operatively adjusts the torque of the motor based upon a container identification associated with the operating parameters.

* * * * *